(12) United States Patent
Lamour et al.

(10) Patent No.: US 11,169,543 B2
(45) Date of Patent: Nov. 9, 2021

(54) DEVICE AND METHOD FOR CONVERTING A GUIDANCE SETPOINT SIGNAL INTO A CONTROL SIGNAL FOR AN AVIONICS SYSTEM, RELATED PILOT AID SYSTEM AND COMPUTER PROGRAM

(71) Applicant: THALES, Courbevoie (FR)

(72) Inventors: Romain Lamour, Toulouse (FR);
Frédéric Berger, Toulouse (FR);
François Colonna, Toulouse (FR);
Marianne Cazes, Toulouse (FR)

(73) Assignee: THALES, Courbevoie (FR)

( * ) Notice: Subject to any disclaimer, the term of this patent is extended or adjusted under 35 U.S.C. 154(b) by 180 days.

(21) Appl. No.: 16/435,239

(22) Filed: Jun. 7, 2019

(65) Prior Publication Data

US 2019/0384326 A1    Dec. 19, 2019

(30) Foreign Application Priority Data

Jun. 14, 2018 (FR) ..................... 18 00610

(51) Int. Cl.
*G05D 1/10* (2006.01)
*B64C 13/18* (2006.01)

(52) U.S. Cl.
CPC ............. *G05D 1/101* (2013.01); *B64C 13/18* (2013.01)

(58) Field of Classification Search
CPC .. G05D 1/101; B64C 13/18; B64C 13/00–507
See application file for complete search history.

(56) References Cited

U.S. PATENT DOCUMENTS

| 4,387,432 A | 6/1983 | Fischer et al. | |
| 5,722,620 A * | 3/1998 | Najmabadi | G05D 1/0816 244/181 |
| 2007/0069083 A1* | 3/2007 | Shams | G05D 1/101 244/195 |
| 2009/0302173 A1* | 12/2009 | Hanchey | B64C 13/18 244/76 A |

OTHER PUBLICATIONS

Communicatioh issued by the French Patent Office in counterpart French Application No. 1800610, dated Apr. 9, 2019.

* cited by examiner

*Primary Examiner* — Aaron L Troost
(74) *Attorney, Agent, or Firm* — Arent Fox LLP

(57) ABSTRACT

A conversion device for converting a guidance setpoint signal from an aircraft guidance system for at least one control axis, for example, into a control signal for an avionics system such as an aircraft stabilization system. The device may include comprising an acquisition module designed to acquire the guidance setpoint signal. The device may further include a generation module designed to generate the control signal from the acquired guidance setpoint signal. The control signal may include at least two command pulses. The generation module may be designed to calculate the duration between two consecutive command pulses depending on a corresponding value of the acquired guidance setpoint signal.

9 Claims, 4 Drawing Sheets

DEVICE AND METHOD FOR CONVERTING A GUIDANCE SETPOINT SIGNAL INTO A CONTROL SIGNAL FOR AN AVIONICS SYSTEM, RELATED PILOT AID SYSTEM AND COMPUTER PROGRAM

CROSS-REFERENCE TO RELATED APPLICATIONS

This application is a U.S. non-provisional application claiming the benefit of French Application No. 18 00610 filed on 14 Jun. 2018 which is hereby incorporated by reference in its entirety.

TECHNICAL FIELD OF THE INVENTION

The present invention relates to a conversion device for converting a guidance setpoint signal derived from an aircraft guidance system for at least one control axis into a control signal for an avionics system, such as an aircraft stabilization system.

The invention also relates to a pilot aid system comprising a guidance system designed to deliver a guidance setpoint signal, an avionics system, such as a stabilization system, and a conversion device.

The invention also relates to a method for converting a guidance setpoint signal derived from an aircraft guidance system for at least one control axis, into a control signal for an avionics system, such as an aircraft stabilization control system, the method being implemented by an electronic conversion device.

The invention also relates to a non-transitory computer-readable medium including a computer program, also called a computer program product, comprising software instructions which, when implemented by a computer, implement such a conversion method.

The invention applies to the field of avionics, and more particularly to that of pilot aid systems, such as systems comprising stabilization and guidance systems.

The term "aircraft" is understood to mean a mobile craft piloted by at least one pilot, and capable of flying especially in the Earth's atmosphere, such as an airplane, a drone or a helicopter.

The term "pilot" is understood to mean a person flying the aircraft from a cockpit located in, or remote from, the aircraft.

The term "control axis" is understood to mean an axis about which an aircraft makes a movement. This corresponds, for example, to roll, pitch and yaw, and are then respectively called the roll axis, pitch axis and yaw axis. The engine thrust control of the aircraft, the latter corresponding to the collective pitch when the aircraft is a helicopter, will also be included in the aircraft control axes.

BACKGROUND OF THE INVENTION

Aircraft are generally equipped with stabilization systems which are in charge of controlling the commands on the aircraft control axes, in particular to dampen the oscillations of the aircraft. These stabilization systems are generally associated either with a manual instruction acquisition system providing control signals acting on the control surfaces of the aircraft according to manual commands controlled by the pilot, or with a guidance system for providing guidance instructions for automatic piloting of the aircraft.

The product AFCS 3000 is known as a helicopter pilot aid system. It comprises a guidance system and a stabilization system as described above. The stabilization system has two types of dedicated inputs that are able to receive command signals from the manual instruction acquisition system of the aircraft, and, respectively, guidance setpoint signals from the guidance system.

However, the management of these various dedicated inputs by the stabilization system is complex since it requires adapting the stabilization system as a function of the different functions of the guidance system.

SUMMARY OF THE INVENTION

The object of the present invention is to propose a device and a conversion method making it possible to simplify the interface between a guidance system and an avionics system, such as a system for stabilizing an aircraft, and, in particular, making it possible to add new control functions to the aircraft, without the need to change the interface between the guidance system and the stabilization system.

For this purpose, the object of the invention is a conversion device for converting a guidance setpoint signal derived from an aircraft guidance system for at least one control axis, into a control signal for an avionics system, such as an aircraft stabilization system, comprising:
 an acquisition module designed to acquire the guidance setpoint signal;
 a generation module designed to generate the control signal from the acquired guidance setpoint signal, the control signal comprising at least two command pulses;
 the generation module being designed to calculate the duration between two consecutive command pulses depending on a corresponding value of the acquired guidance setpoint signal.

With the conversion device according to the invention, the guidance instructions from the guidance system and the commands from the manual instruction acquisition system are taken into account by the avionics system via the same inputs dedicated to the control signals and usually intended for manual instructions only, which simplifies the interface between the guidance system and the avionics system, such as the stabilization system.

According to other advantageous aspects of the invention, the conversion device comprises one or more of the following characteristics:
 the avionics system is able to operate according to several different operating states, while the generation module is designed to calculate the duration between two consecutive command pulses via at least one predefined conversion table, selected from several predefined conversion tables depending on a signal indicative of the operating state of the avionics system;
 the conversion device comprises a first and a second output terminal, each of the output terminals being designed to deliver a respective output signal, one originating from the conversion of the positive values of the guidance setpoint signal, the other from the conversion of the negative values of the guidance setpoint signal;
 the conversion device is designed to convert guidance setpoint signals into control signals in parallel for several piloting axes; and
 the conversion device is designed to convert guidance setpoint signals for a plurality of control axes into a global control signal, the avionics system being able to recover the global control signal in input.

The invention also relates to a system for assisting the piloting of an aircraft, the system comprising:

a guidance system designed to deliver a guidance setpoint signal, an avionics system, such as a stabilization system, and a conversion device, connected between the guidance system and the avionics system, the conversion device being designed to convert a guidance setpoint signal from the guidance system into a control signal for the avionics system, the conversion being effected as defined above.

According to other advantageous aspects of the invention, the pilot aid system comprises one or more of the following characteristics:

the system comprises a switching device connected in input of the avionics system and in output of the conversion device, and a system for acquiring aircraft manual instructions, and designed to switch between the output of the conversion device and the output of the manual instruction acquisition system; and the switching device is designed to switch between the output of the conversion device and the output of the manual instruction acquisition system depending on a control signal coming from the guidance system.

The object of the invention is also a method for converting a guidance setpoint signal derived from an aircraft guidance system for at least one control axis, into a control signal for an avionics system, such as an aircraft stabilization system, the method being implemented by an electronic conversion device, and comprising the following steps:

acquisition of the guidance setpoint signal calculation of a duration between two consecutive command pulses depending on a corresponding value of the acquired guidance setpoint signal, and generation of the control signal from the duration between two command pulses calculated consecutively, the control signal comprising at least two command pulses.

The invention also relates to a non-transitory computer-readable medium including a computer program comprising software instructions which, when implemented by a computer, implement a conversion method as defined above.

BRIEF DESCRIPTION OF THE DRAWINGS

These features and advantages of the invention will become apparent upon reading the following description, given solely by way of non-limiting example, and with reference to the appended drawings, wherein.

DETAILED DESCRIPTION OF THE PREFERRED EMBODIMENTS

Figure 1:
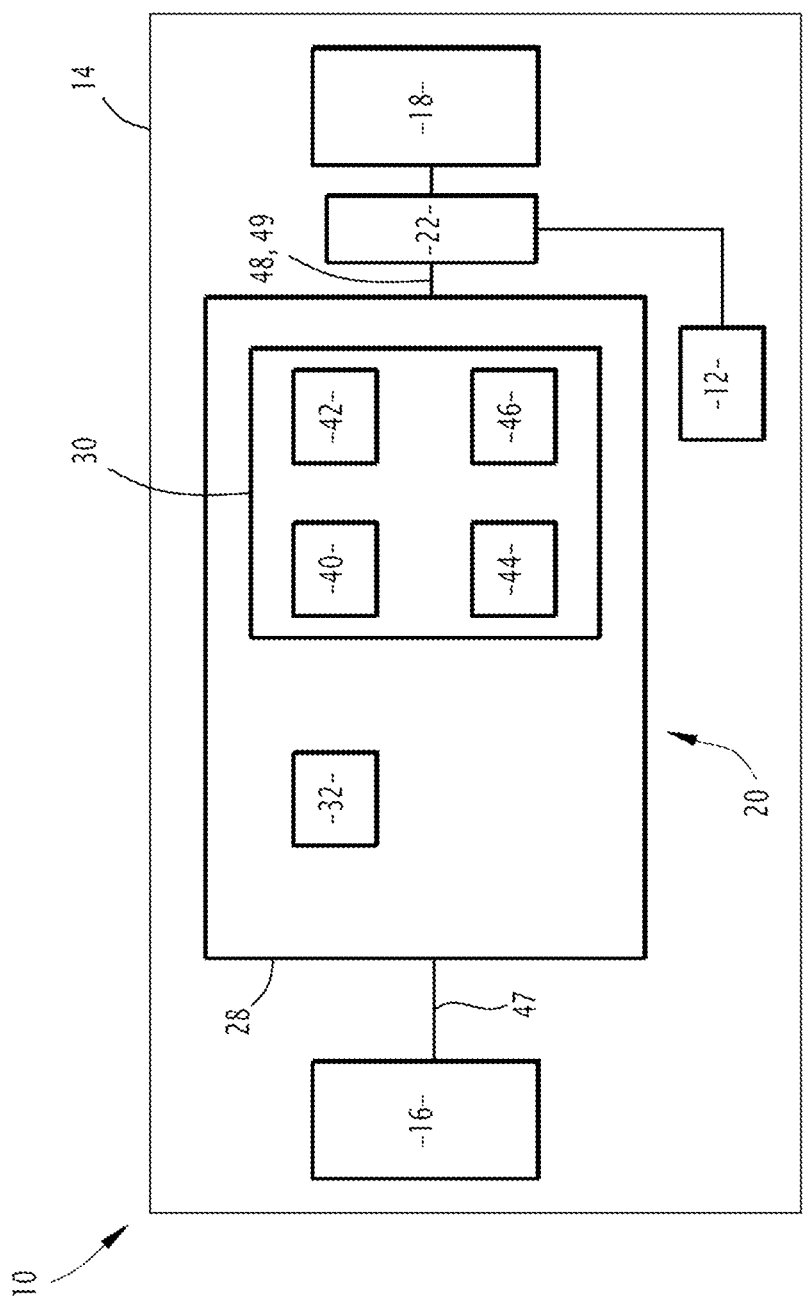
FIG. 1 shows a schematic representation of an aircraft comprising a system for acquiring manual setpoints and a system for aiding the piloting of the aircraft, the pilot aid system comprising, in particular, a guidance system, an avionics system and a conversion device according to the invention.

In FIG. 1, an aircraft 10, such as a helicopter, comprises a system 12 for acquiring manual instructions and a pilot aid system 14. The aircraft 10 may be, in a variant, an airplane or a drone.

The manual instruction acquisition system 12 is known per se, and is capable of generating control signals for acting, for example, on a stabilization system, which is itself designed to act on the control surfaces of the aircraft 10 relative to at least one control axis. These control signals are generated in the form of command pulses according to the action of the pilot on the manual controls of the aircraft 10. The corresponding movements of the control surfaces are then actuated during the duration of each pulse.

Figure 2:
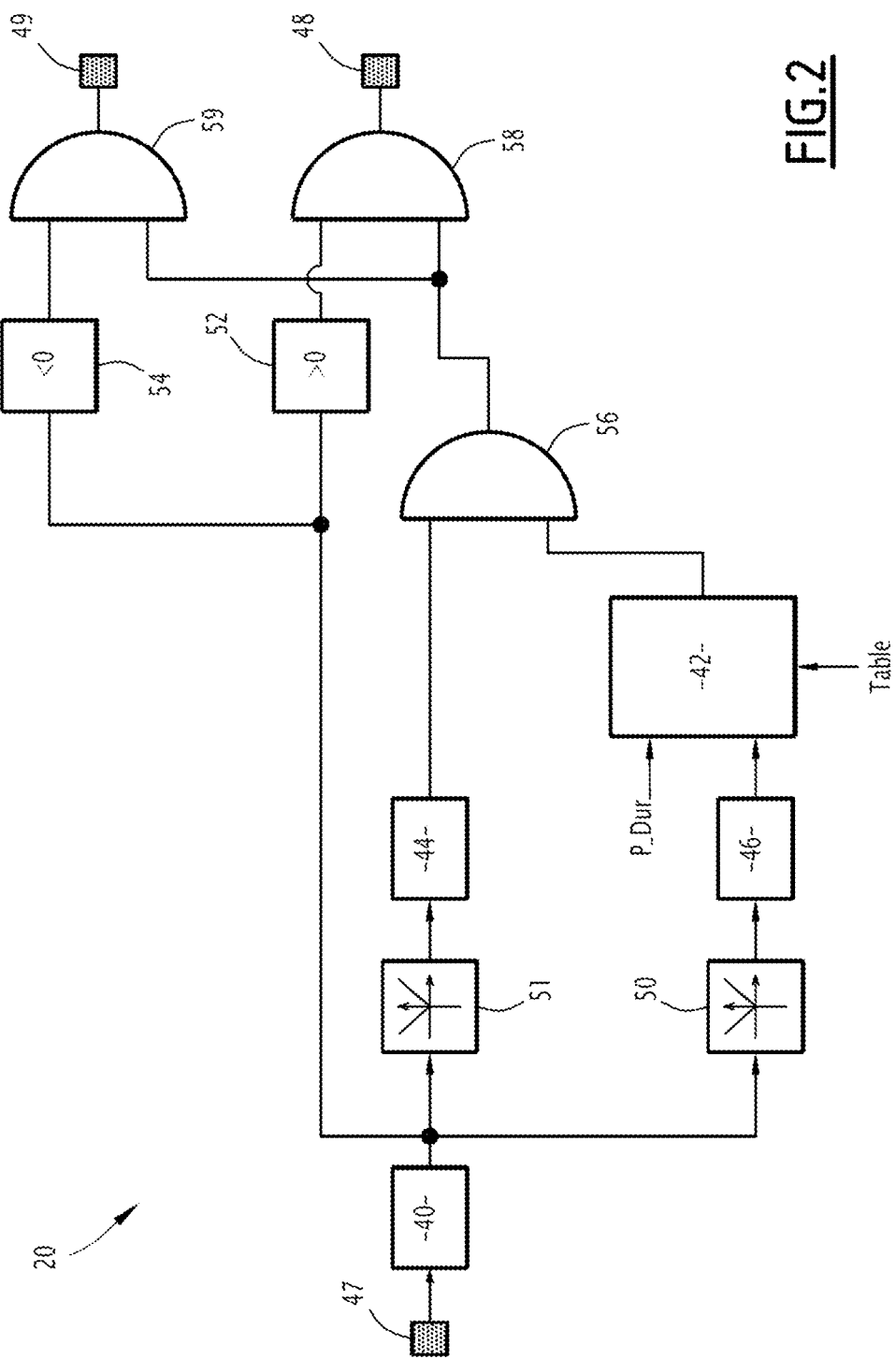
FIG. 2 shows a block diagram of one embodiment of a conversion device according to the invention.

In the example of FIG. 2, the manual instruction acquisition system 12 is included in the pilot aid system 14.

Alternatively, not shown, the manual instruction acquisition system 12 is distinct from the pilot aid system 14.

The pilot aid system 14 is capable of providing assistance to the pilot of the aircraft 10 during the piloting thereof, in particular by calculating the commands with respect to at least one control axis of the aircraft 10 enabling automatic control of the aircraft 10.

The pilot aid system 14 comprises a guidance system 16, an avionics system 18, a conversion device 20. In addition, the pilot aid system 14 comprises a switching device 22.

The guidance system 16 is known per se and is designed to calculate guidance instructions with respect to at least one control axis of the aircraft 10 allowing the aircraft 10 to follow a path defined by the pilot. The guidance setpoint signals each take a value that changes depending on the time representing the amplitude of the movement that the aircraft 10 must perform relative to the corresponding control axis in order to follow the defined trajectory.

The avionics system 18 is, for example, an aircraft stabilization system. It is known per se and makes it possible to act on the control surfaces of the aircraft 10 with respect to at least one control axis of the aircraft depending on control signals recovered in input, in particular to dampen any oscillations of the aircraft 10 with respect to the control axes.

In addition and optionally, the avionics system 18 is able to operate according to several different operating states, corresponding, for example, to different flight envelopes of the aircraft 10.

The conversion device 20 is connected between the guidance system 16 and the avionics system 18. It is designed to convert a guidance setpoint signal from the guidance system 16 into a control signal for the avionics system 18.

In the example of FIG. 1, the conversion device 20 comprises an information processing unit 28 comprising a memory 30 and a processor 32 associated with the memory 30.

The conversion device 20 comprises an acquisition module 40 designed to acquire the guidance setpoint signal, and a generation module 42 designed to generate the control signal from the acquired guidance setpoint signal, the control signal comprising at least two command pulses, the generation module 42 being designed to calculate the duration between two consecutive command pulses depending on a corresponding value of the acquired guidance setpoint signal. Those skilled in the art will then understand that the control signal is a discrete type signal.

In addition, the conversion device 20 comprises a thresholding module 44 and a limitation module 46.

The conversion device 20 comprises, for example, an input terminal 47 designed to receive the guidance setpoint signal, and a first and a second output terminal 48 and 49 each designed to output a respective control signal, the first output terminal 48 outputting a signal corresponding to the generation of the control signal from the positive values of the guidance setpoint signal received at the input terminal 47, and the second output terminal 49 outputting a signal corresponding to the generation of the control signal from the negative values of the guidance setpoint signal received at the input terminal 47. These two output signals correspond to the control signals for opposite directions of the same control axis.

In the example of FIG. 2, the conversion device 20 may optional comprise first and second absolute value calculation modules 50 and 51, a positive value detection module 52, a negative value detection module 54, and first, second and third "AND" logic gates 56, 58 and 59.

Alternatively, the conversion device 20 may be designed to convert guidance setpoint signals into control signals for several control axes. The conversion device 20 then comprises a plurality of input terminals 47 for receiving guidance setpoint signals from the guidance system 16 for the different control axes, each input terminal 47 being, for example, associated with a respective control axis. The conversion device 20 comprises several pairs of output terminals 48, 49 designed to output to the avionics system 18 control signals corresponding to the respective conversions of each guidance setpoint signal, each pair of output terminals 48, 49 being, for example, associated with a respective control axis.

Alternatively, the conversion device 20 may be designed to convert guidance setpoint signals for a plurality of control axes into a global control signal. The conversion device 20 then comprises a plurality of input terminals 47 for receiving guidance setpoint signals from the guidance system 16 for the different control axes, each input terminal 47 being, for example, associated with a respective control axis. The conversion device 20 comprises a pair of output terminals 48, 49 designed to deliver to the avionics system 18, a global control signal for a control surface with respect to a control axis, corresponding to the overall conversion of the guidance setpoint signals, the global control signal being able to act on the movement of the aircraft either directly with respect to the control axis associated with the controlled surface, or indirectly with respect to the other control axes associated with the guidance instructions. This is done, for example, by yaw-roll coupling where the movement about the roll axis is also likely to impact the behavior of the aircraft about the yaw axis.

Those skilled in the art will understand that, alternatively, the conversion device 20 may be included in the guidance device, and the generation module is then designed to directly recover the guidance signals.

The switching device 22 is connected to the input of the avionics system 18, and to the output of the conversion device 20 and the manual instruction acquisition system 12. It is designed to switch between the output of the conversion device 20 and the output of the manual instruction acquisition system 12, which makes it possible to respectively activate and deactivate a coupled function of the pilot aid system 14, the coupled function corresponding to the use of the guidance system 16 and the conversion device 20.

In addition and optionally, the switching device 22 may be designed to switch between the output of the conversion device 20 and the output of the manual instruction acquisition system 12 depending on a control signal coming from the guidance system 16, the control signal corresponding to a signal indicating the activation or deactivation of the coupled function.

In the example of FIG. 1, the acquisition module 40, and the generation module 42, as well as the optionally added thresholding module 44, and the limitation module 46, are each made in the form of software, or a software brick, that is executable by the processor 32. The memory 30 is then able to store acquisition software designed to acquire a guidance setpoint signal and generation software designed to generate a control signal from an acquired guidance setpoint signal and, optionally, thresholding software designed to output a pulse when the value of the guidance setpoint signal recovered in input is above a predefined threshold value and, optionally in addition, a limiting software designed to limit the guidance setpoint signal to a limit value equal to the inverse of a maximum processing frequency of the control signal by the avionics system 18. The processor 32 is then designed to execute each of the software instructions from the acquisition software, the generation software, as well as an optionally added thresholding software and the limitation software.

In a variant, the acquisition module 40 and the generation module 42, as well as the optionally added thresholding module 44 and the limitation module 46, are implemented in the form of programmable logic components, such as one or more FPGA (Field-Programmable Gate Array), or in the form of dedicated integrated circuits of the ASIC type (Application-Specific Integrated Circuit).

When the conversion device 20 is made in the form of one or more software programs, i.e. in the form of a computer program, it is also able to be recorded on a medium (not shown) that is readable by computer. The computer-readable medium is, for example, a medium capable of storing electronic instructions and being coupled to a bus of a computer system. By way of example, the readable medium may be an optical disk, a magneto-optical disk, a ROM memory, a RAM memory, any type of non-volatile memory (for example EPROM, EEPROM, FLASH, NVRAM), a magnetic card or an optical card. On the readable medium is then stored a computer program including software instructions.

With reference to FIG. 2, the acquisition module 40 is connected to the input terminal 47 and is designed to acquire a guidance setpoint signal received at the input terminal 47, this guidance setpoint signal being derived from the guidance system 16.

In a variant, the acquisition module 40 is connected to several input terminals 47, and is designed to acquire guidance setpoint signals relating to several control axes.

The generation module 42 is designed to generate the control signal from the guidance setpoint signal from the acquisition module 40 and from a value of a predefined pulse duration P_Dur, the control signal comprising at least two command pulses.

In addition, the generation module 42 is designed to calculate a duration P_P between two consecutive command pulses depending on a corresponding value of the acquired guidance setpoint signal.

It should be noted that, in the example described, the higher the value of the guidance setpoint, the shorter the duration P_P calculated as a function thereof, since the duration P_P is calculated in order to take values effecting the opposite of the values of the guidance setpoint signal.

In addition and optionally, the generation module 42 is further designed to calculate the duration P_P between two consecutive command pulses via at least one predefined conversion table, selected from several predefined conversion tables depending on a table signal from the avionics system 18 or guidance system 16, indicative of the operating state of the avionics system 18.

To generate the control signal, the generation module 42 is designed to check at each operating step whether a pulse generation condition is satisfied. The pulse generation condition is, for example, that the duration since the beginning of the last generated command pulse is greater than the calculated duration P_P. The generation module 42 is then designed to generate a duration pulse P_Dur each time this condition is verified.

In a variant, the generation module 42 is designed to recover at the output of the acquisition module 40 guidance setpoint signals relating to several control axes and to calculate for each guidance setpoint signal a duration P_P between two consecutive command pulses, for example, via conversion tables. The generation module 42 is then designed to generate, for each calculated duration P_P, a control signal according to the aforementioned pulse generation condition. It is then designed to output the generated control signals.

In a variant, the generation module 42 may be designed to recover at the output of the acquisition module 40 guidance setpoint signals relating to several control axes and to calculate a duration P_P between two consecutive command pulses, for example via a conversion table taking as input the different values of the guidance setpoint signals. The generation module 42 is then designed to generate a global control signal according to the pulse generation condition previously specified. It is then designed to output the generated global control signal.

In addition and optionally, the thresholding module 44 may be connected to the output of the acquisition module 40 and designed to output a pulse when the value of the guidance setpoint signal acquired by the acquisition device 40 is above a threshold value chosen beforehand. The first "AND" logic gate 56 is then connected to recover the pulses from the thresholding module 44 and the generation module 42, and is designed to deliver a control signal corresponding to the conversion of a clipped setpoint signal to the threshold value.

In addition and optionally, the limitation module 46 may be connected between the acquisition module 40 and the generation module 42. It is designed to limit the guidance setpoint signal to a limit value equal to the inverse of a maximum frequency of the control signal processing by the avionics system 18.

In addition and optionally, the positive value detection module 52 and the negative value module 54 are connected in parallel to the output of the acquisition module 40. The positive value detection module 52 is designed to deliver a pulse when the value of the signal guidance setpoint is positive. Similarly, the negative value detection module 54 is designed to output a pulse when the value of the guidance setpoint signal is negative. The first absolute value calculation module 50 is then connected between the acquisition module 40 and the generation module 42. In addition, the second absolute value calculation module 51 is connected between the acquisition module 40 and the thresholding module 44. The second "AND" logic gate 58 is connected to recover pulses from the detection module 52 and the generation module 42 or, optionally in addition, the first "AND" logic gate 56, and is connected to the output terminal 48. In the same way, the third "AND" logic gate 59 is connected to recover pulses from the detection module 54 and the generation module 42 or, optionally in addition, the first "AND" logic gate 56, and is connected to the output terminal 49. The terminals 48 and 49 are therefore each designed to output a respective output signal, one from the conversion of the positive values, the other from the conversion of the negative values of the guidance setpoint signal.

In addition and optionally, the conversion tables are interpolation tables making it possible to give, for an input value, an estimate of its conversion according to the interpolation used. The conversion tables used include values reflecting an inverse function. Alternatively, an inverter, calculating the inverse of a value, may be connected in input of the generation module 42, and the conversion table may be, for example, a linear interpolation table.

Figure 3:
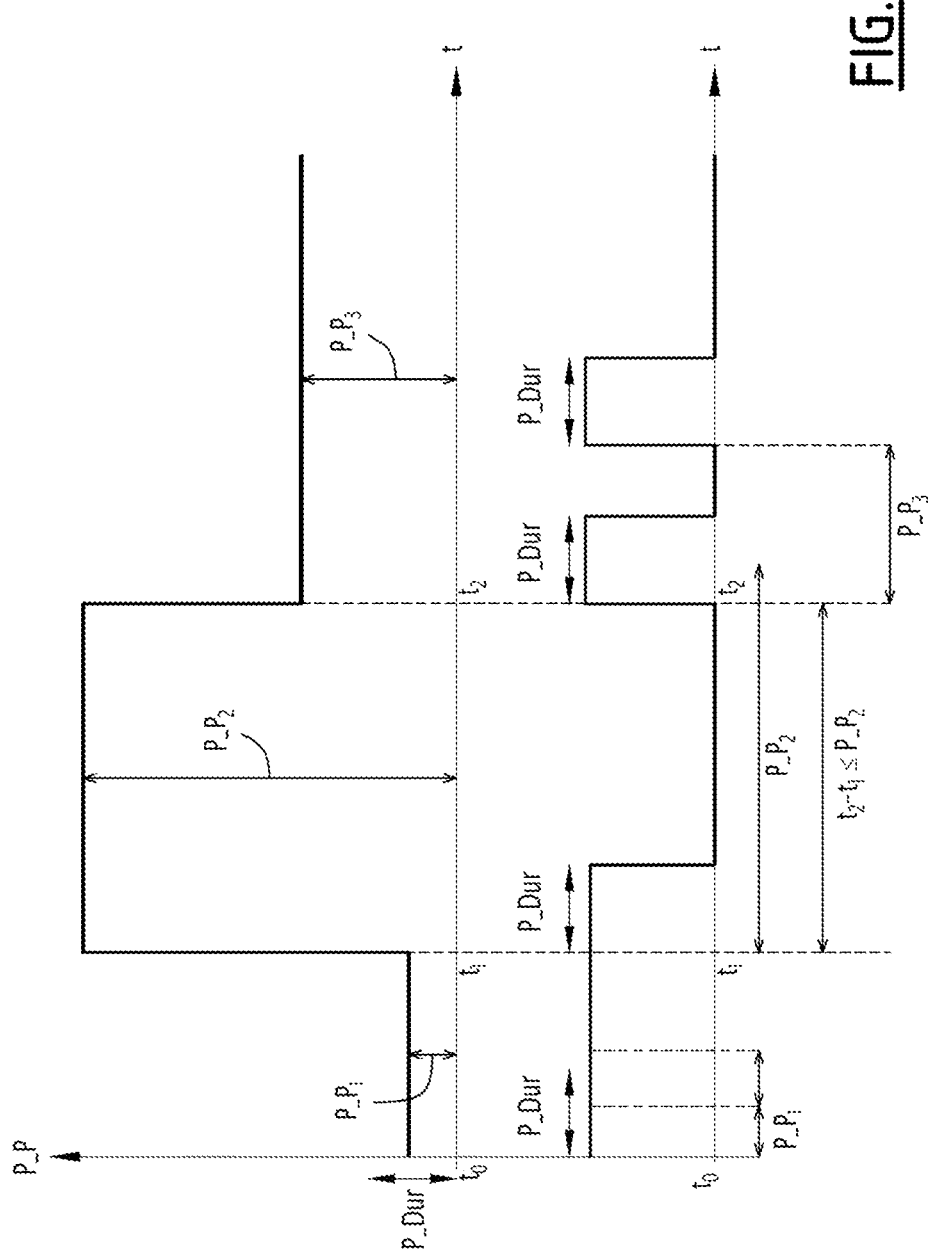
FIG. 3 shows a graph showing an example of the temporal evolution of the value of the duration between two consecutive command pulses, calculated by the conversion device according to the invention, as well as the temporal evolution of the value of the control signal generated by the conversion device according to the invention from the time calculated between two consecutive command pulses.
Figure 4:
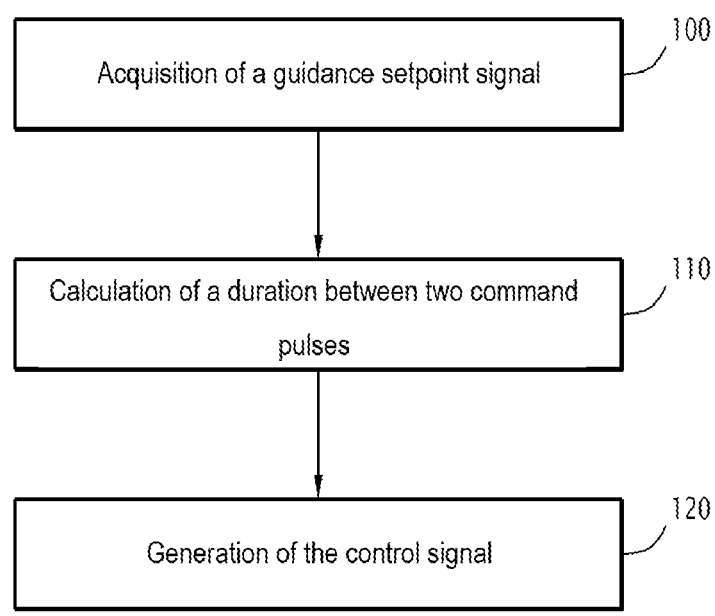
FIG. 4 shows a flowchart of a method according to the invention for converting a guidance setpoint signal into a control signal.

The operation of the conversion device 20 according to the invention will now be described with the aid of FIG. 3 representing an example of the temporal evolution of the value of the duration P_P calculated by the conversion device 20 according to the invention, as well as the temporal evolution of the value of the control signal generated by the conversion device 20 according to the invention from the duration P_P calculated between two consecutive command pulses, and the aid of FIG. 4 representing a flowchart of the process of pilot aid according to the invention.

In the embodiment described, the conversion device 20 operates over a very small time step in front of the calculated values of the duration P_P.

During an initial step 100, the acquisition module 40 acquires the guidance setpoint signal from the guidance system 16.

At each operating step, depending on the corresponding value of the guidance setpoint signal acquired during step 100, the generation module 42 calculates a duration P_P between two consecutive command pulses, during step 110, for example, via a conversion table.

In step 120, the generation module 42 generates a control signal from the duration P_P calculated between two consecutive command pulses during step 110 and the pulse duration P_Dur previously chosen, according to the condition pulse generation described above.

In the example of FIG. 3, the generation module 42 calculates duration values P_P from a guidance setpoint (not shown), for example using a predefined conversion table. These values of the duration P_P are equal to $P\_P_1$ between time instants $t_0$ and $t_1$, $P\_P_2$ between time instants $t_1$ and $t_2$, then $P\_P_3$ beyond the time instant $t_2$. The command pulses generated from these duration values P_P are also represented depending on time.

When the duration P_P is shorter than the duration P_Dur, as, for example, between the time instants $t_0$ and $t_1$, the control signal corresponds to a continuous pulse. In fact, before the current pulse falls, a new pulse is generated. The duration P_Dur therefore corresponds to a low limit of the duration P_P below which the control signal is not able to include more command pulse.

The generation module 42 takes into account, at each operating step, the new calculated duration P_P. Thus, in the example of FIG. 3, between the time instants $t_1$ and $t_2$, the duration since the beginning of the last generated command pulse is less than the duration $P\_P_2$ and no new pulse is generated. At the first operating step following the time instant $t_2$, the new duration P_P is equal to $P\_P_3$ and is then less than the duration since the beginning of the last generated command pulse. A new impulse is generated.

After the time instant $t_2$, the duration P_P is constantly equal to $P\_P_3$. The generated control signal therefore corresponds to pulses of duration P_Dur spaced apart by a period $P\_P_3$.

Those skilled in the art will understand that even if the control signal generated by the conversion device 20 comprises at least two command pulses, two distinct command pulses are not necessarily associated with each value of the guidance setpoint signal to be converted. By way of example, in FIG. 3, only one pulse is associated with the second value of the guidance setpoint signal, corresponding to the duration $P\_P_2$. In fact, the next pulse associated with the third value of the guidance setpoint signal (corresponding to the duration $P\_P_3$) is generated before the end of the duration $P\_P_2$, which has been counted from the beginning of the pulse associated with the second value of the guidance setpoint signal, and another pulse is not generated for this second value.

Thus, the conversion device 20 according to the invention then allows the avionics system 18 to receive guidance instructions from the guidance system 16 directly via the inputs normally dedicated to the control signals from the aircraft manual instruction acquisition system 12.

The optionally additional feature according to which the generation module 42 is designed to calculate the duration between two consecutive command pulses via at least one predefined conversion table, selected from several predefined conversion tables, depending on the operating state of the avionics system 18, makes it possible to adapt the conversion, for example, to the flight conditions of the aircraft 10 and to external conditions.

When the conversion device 20 is designed to convert guidance setpoint signals for a plurality of control axes into a global control signal, this enables the avionics system 18 to take into account guidance instructions from a guidance system 16 for several control axes at the same time, especially when the avionics system 18 is not able to take into account several control signals in parallel, for example because of mechanical constraints.

In addition and optionally, when the switching device 22 is designed to switch between the output of the conversion device 20 and the output of the manual instruction acquisition system 12 depending on a control signal coming from the guidance system 16, this allows the guidance system 16 to force deactivation of the coupled function, especially when a failure of the guidance system is detected.

It is therefore conceivable that the conversion device 20 and the conversion method according to the invention make it possible to simplify the interface between the guidance system 16 and the avionics system 18.

The invention claimed is:

1. Conversion device of a guidance setpoint signal from an aircraft guidance system for at least one control axis, into a control signal for an avionics system, the conversion device comprising:
   an acquirer configured to acquire the guidance setpoint signal;
   a generator configured to generate the control signal from the acquired guidance setpoint signal, the control signal comprising at least two command pulses,
   the generator being configured to calculate a duration between two consecutive command pulses depending on a corresponding value of the acquired guidance setpoint signal,
   wherein when the duration between two consecutive command pulses is longer than a predefined duration pulse, each pulse of the two consecutive command pulses has a duration equal to the predefined duration pulse.

2. Conversion device according to claim 1, wherein the avionics system is operable in a plurality of different operating states, and wherein the generator is configured to calculate the duration between two consecutive command pulses via at least one predefined conversion table selected from among several predefined conversion tables depending on a signal indicative of the operating state of the avionics system.

3. Conversion device according to claim 1, wherein the conversion device further comprises a first output terminal and a second output terminal, the output terminals each being configured to output a respective output signal, a first from the conversion of positive values of the guidance setpoint signal, the second from the conversion of negative values of the guidance setpoint signal.

4. Conversion device according to claim 1, wherein the conversion device is configured to convert guidance setpoint signals into control signals in parallel for several control axes.

5. Conversion device according to claim 1, wherein the conversion device is configured to convert guidance setpoint signals for a plurality of control axes into a global control signal, the avionics system being configured to receive the global control signal in input.

6. Conversion device according to claim 1, wherein the avionic system is an aircraft stabilization system.

7. Pilot aid system for an aircraft, the system comprising:
   a guidance system configured to deliver a guidance setpoint signal,
   an avionics system, and
   a conversion device connected between the guidance system and the avionics system, the conversion device being configured to convert a guidance setpoint signal from the guidance system into a control signal for the avionics system,
   wherein the conversion device is according to claim 1.

8. Method for converting a guidance setpoint signal from an aircraft guidance system for at least one control axis into a control signal for an avionics system,
   the method being implemented by an electronic convertor and comprising steps:
   acquisition of the guidance setpoint signal,
   calculation of a duration between two consecutive command pulses depending on a corresponding value of the acquired guidance setpoint signal, and
   generation of the control signal from the duration between two calculated consecutive command pulses, the control signal comprising at least two command pulses,
   wherein when the duration between two consecutive command pulses is longer than a predefined duration pulse, each pulse of the two consecutive command pulses has a duration equal to the predefined duration pulse.

9. A non-transitory computer-readable medium including a computer program comprising software instructions which, when executed by a computer, implement a method according to claim 8.

* * * * *